United States Patent [19]

Covington

[11] 4,240,222
[45] Dec. 23, 1980

[54] TACKLE BOX

[76] Inventor: Dorris L. Covington, 701 N. Bosart, Indianapolis, Ind. 46201

[21] Appl. No.: 973,137

[22] Filed: Dec. 26, 1978

[51] Int. Cl.³ .............................................. A01K 97/06
[52] U.S. Cl. ............................. 43/57.5 R; 206/315 R; 312/244; 312/DIG. 33
[58] Field of Search ....................... 43/54.5 R, 57.5 R; 206/315, 45.11; 312/DIG. 33, 244, 201, 298, 198, 183; 190/52 R; 229/52 AL

[56] References Cited

U.S. PATENT DOCUMENTS

| | | | |
|---|---|---|---|
| 1,241,615 | 10/1917 | Farrow | 312/201 X |
| 1,858,086 | 5/1932 | House | 312/201 |
| 2,539,302 | 1/1951 | Fye | 43/54.5 R X |
| 3,071,885 | 1/1963 | MacKay | 43/57.5 R |
| 3,144,196 | 8/1964 | Sindars | 229/52 AL |
| 3,197,915 | 8/1965 | Stauer | 43/57.5 R |
| 3,410,376 | 11/1968 | Benzel | 190/52 X |
| 3,481,066 | 12/1969 | Woolworth | 312/244 X |
| 3,604,773 | 9/1971 | Haynes | 312/244 |
| 3,758,977 | 9/1973 | Miller | 43/57.5 R |
| 3,948,579 | 4/1976 | Schirmer | 43/57.5 R |

Primary Examiner—Nicholas P. Godici
Attorney, Agent, or Firm—Woodard, Weikart, Emhardt & Naughton

[57] ABSTRACT

A tackle box has a horizontal stack of upstanding rectangular housing units. The stack can be opened like a fan for access to contents, as adjacent units are hinged by vertical hinge pins. The pins are readily removable so units can be added or deleted as desired by fishermen. A handle anchor slot in the top of each unit, and flexible carrying handle, facilitate carrying the stack.

19 Claims, 18 Drawing Figures

TACKLE BOX

BACKGROUND OF THE INVENTION

1. Field of the Invention

This invention relates generally to fishing tackle boxes, and more particularly to a tackle box comprising a plurality of units in assembly, each unit having provisions for particular types of bait or gear or both, and the units being conveniently separable for arrangement as needed according to the type of fishing to be done.

2. Description of the Prior Art

Various kinds of tackle boxes have been devised. Some are shown in the United States patents as follows:

| | | |
|---|---|---|
| 3,005,671 | Majeski | October 24, 1961 |
| 3,022,600 | Glasscoff | February 27, 1962 |
| 3,437,389 | Perkins Et Al | April 8, 1969 |
| 3,780,468 | Maffett | December 25, 1973 |
| 3,947,991 | Morcom | April 6, 1976 |
| 4,006,553 | Porter Et Al | February 8, 1977 |

The Majeski patent is of interest for its showing of a stack of trays useful to contain baits and other items of fishing tackle. I have found from experience that where trays are comparatively shallow, there is a tendency to stack baits on top of each other. The result is that, unless special attention is taken to remove them from the box or otherwise be sure that they are exposed to air for rapid drying after use, there is a likelihood that they will become rusty sitting atop one another in trays.

The Glascoff patent discloses an arrangement eliminating the need to stack baits on each other, but is somewhat limited in its capacity. The Perkins and Morcom references seem to share the disadvantage of Majeski in that the trays are comparatively shallow, and thus do not permit the baits to hang. The Maffett and Porter patents disclose structures in which the baits can hang by the hooks, as in Glascoff, and Porter provides holes 52 in the bottom for drainage. Yet these patents which do disclose the hanging of lures to permit drainage, demand a considerable amount of horizontal space and are therefore not too conveniently portable by one hand. In addition, they do not lend themselves to convenient expansion of capacity while retaining convenience of access to the bait. The present invention is intended to make it easier to store and carry the number and type of baits that a fisherman intends to use, making them readily accessible, when needed, and convenient to store without rusting, after use.

BRIEF SUMMARY OF THE INVENTION

Described briefly, in a typical embodiment of the present invention, a tackle box comprises a plurality of generally rectangular housing units hinged together on vertical hinge axes and having a handle at the top by which they can be conveniently carried as a horizontal stack by a single handle. Hinges are constructed to facilitate intentional disconnection thereof, so the number of units in assembly can be varied, to suit the needs of the fisherman. The various units have various interior features to facilitate storage of the type of baits and other tackle and accessories which may be needed.

DESCRIPTION OF THE PREFERRED EMBODIMENT

Figure 1:
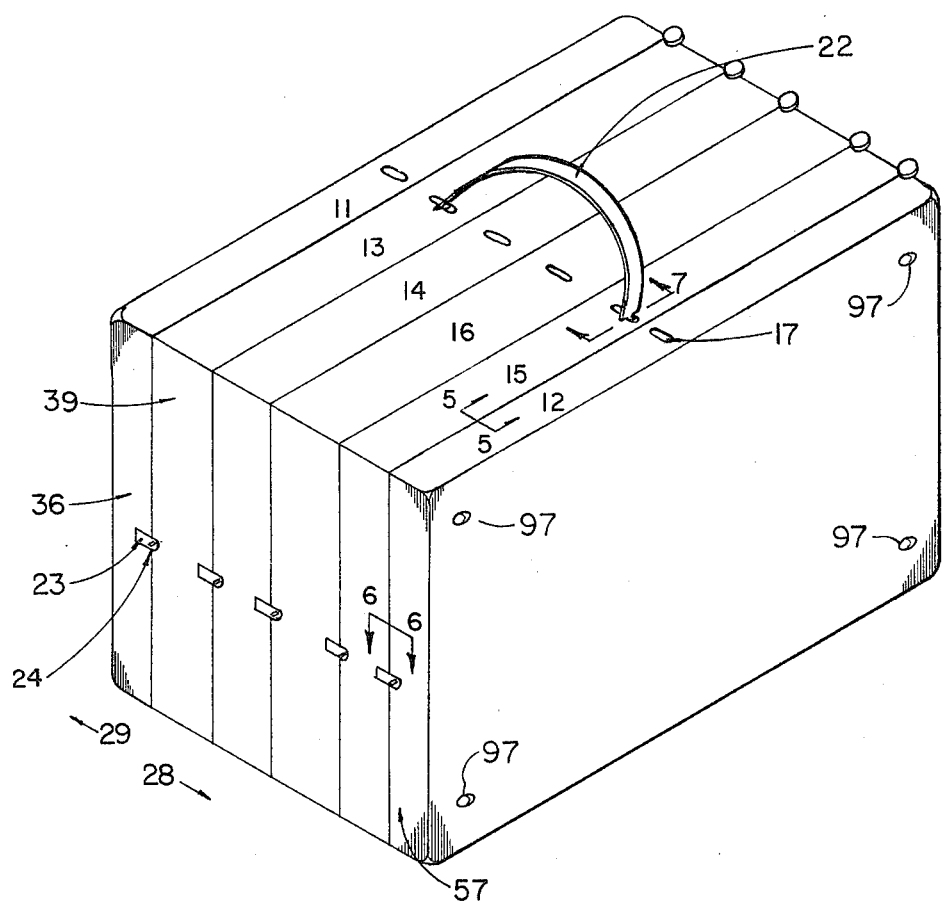
FIG. 1 is a perspective view of a tackle box illustrating a typical embodiment of the present invention.

Referring now to the drawings in detail, FIG. 1 shows a horizontally stacked assembly of six units 11, 12, 13, 14, 15, and 16 which, in assembly, form a tackle box. Each of these units has a top with a horizontally extending slot such as 17 therein. This top has a cavity 18 wider than the slot and accommodating the oppositely directed lugs 19 and 21 at both ends of the hand carrying strap 22. Each of the slots is long enough in a direction extending from the one end unit 11 to the other end of the unit 12 so that by turning the strap perpendicular to the slot or by twisting it so the end lugs are parallel to the slot, the lugs 19 and 21 can easily be inserted into the hole through the longitudinal dimension of the slot, whereupon the strap end is returned to orient the lugs transverse to the slot, whereupon the strap is useful for lifting the unit by the lugs abuttingly engaging the underside of portions of the top adjacent slot 17 and covering the cavity 18. Each of the units has such a top opening with the cavity-covering slot side walls as just described, so that the strap can be attached to any two of the units to facilitate carrying the assembly.

Figure 6:
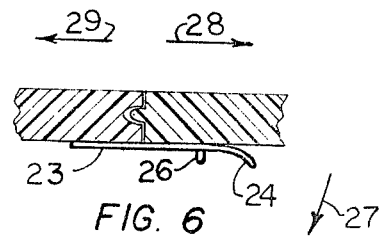
FIG. 6 is an enlarged fragmentary section taken at 6—6 in FIG. 1 to show from above a typical latch shown in FIG. 1.
Figure 7:
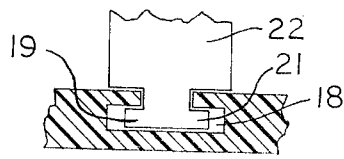
FIG. 7 is an enlarged fragmentary section taken at 7—7 in FIG. 1 to show carrying strap mounting.
Figure 3A:
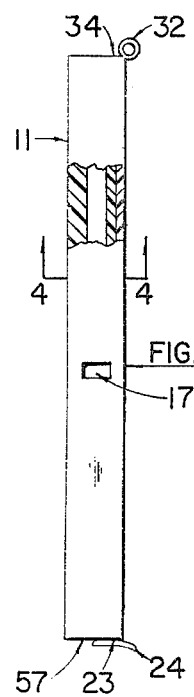
FIGS. 3A through 3F are top views showing all of the units separate from each other, and with portions broken away to show some interior features.
Figure 3B:
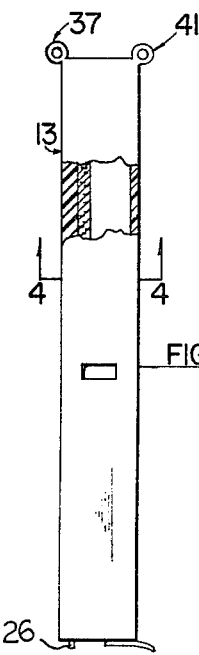
Figure 3C:
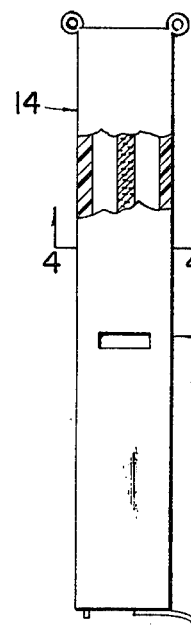
Figure 3D:
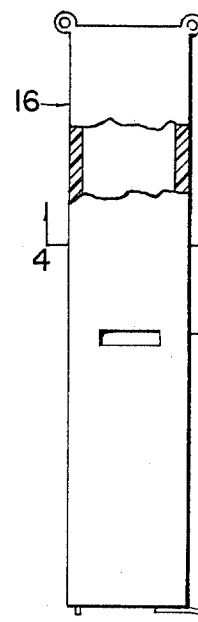
Figure 3F:
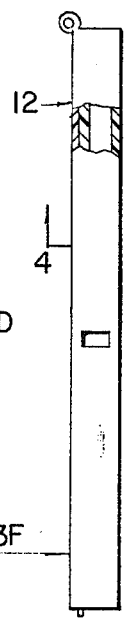
Figure 3E:
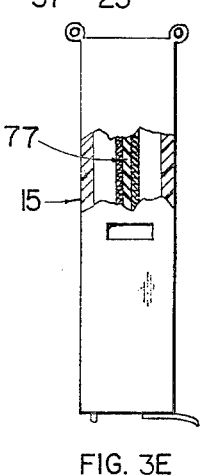

Each of five of the six units shown has a spring clip 23 affixed thereto and having an outwardly turned tip 24 thereon as better shown in FIG. 6. The tip portion has a vertically extending slot therein through which a pin 26 affixed to the next adjacent unit extends. By pulling the spring tab tip portion 24 outward in the direction of arrow 27, the aperture therein is removed from pin 26, whereupon the units can be separated from each other in the direction of arrows 28 and 29 in FIGS. 1 and 6, resulting in swinging open of the units about the hinge pin 31 as shown in FIG. 2.

Figure 2:
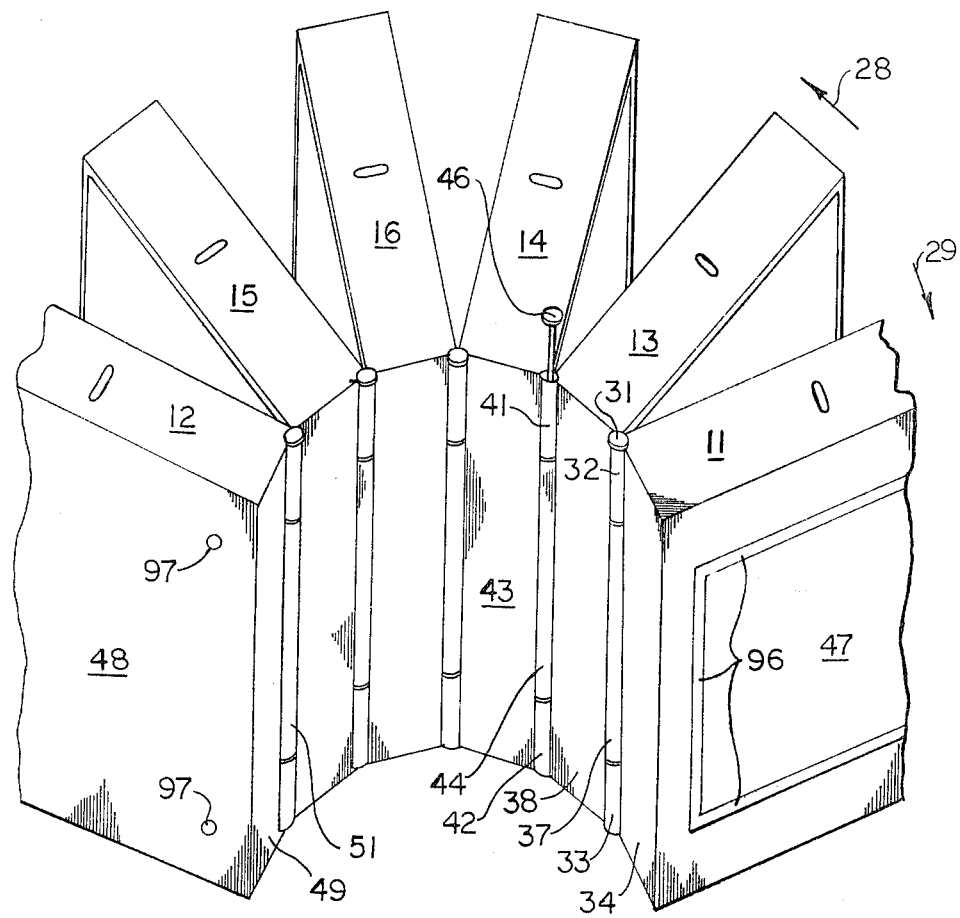
FIG. 2 is a perspective view of the tackle box FIG. 1 showing it from the hinge side and open to permit access to the interiors of all of the units.

As is further shown in FIG. 2, unit 11 has two hinge loops 32 and 33 affixed thereto at the side 34 opposite the latch side 36 (FIG. 1). These loops are actually shown in the form of cylinders. A similar cylinder 37 is affixed to the hinge side 38 of the unit 13, opposite the latch side 39 thereof, and is fittingly received intermediate the upper and lower hinge tubes 32 and 33 of unit 11. The hinge pin 31 is shown partially raised but, when lowered in its normal position, extends completely through tubes 32 and 37 and at least partially through tube 33, to thereby provide a hinged attachment between units 11 and 13. The same kind of construction is used between the units 13 and 14 but, in this instance, the upper and lower hinge tubes 41 and 42, respectively, are affixed to the hinged side 38 at the hinge edge opposite the hinge edge to which the tube 37 is mounted. The hinge side 43 of unit 14 has hinge tube 44 affixed to it and receiving the hinge pin whose head 46 rests on the upper edge of the upper hinge tube 41 of unit 13. The remaining units 12, 15, and 16 have hinge tubes mounted thereon in the same way as the other units except that units 11 and 12, being outside end units, do not have hinge tubes at the junction of the outside end walls 47 and 48 thereof with the hinge sides 34 and 49, respectively.

It should be recognized from this description that, since the rectangular dimensions of the units are the same, the intermediate units 13, 14, 15, and 16, can be interchanged within the box and, if it is desired to eliminate all of the intermediate units, the end unit 11 can be fastened directly to end unit 12 by use of the pin 31 and the mating hinge tubes 32 and 33 of unit 11 with the hinge tube 51 of unit 12. It may also be observed that, since the hinge tubes have colinear axes when the units are assemblied with the hinge pins 31 and the like in each of the hinge assemblies, an alternate construction may be devised which would include, for example, a coil spring in tube 44 with detent balls at the upper and lower ends of the tube 44 and which are retained in the tube but project therefrom so that, when unit 14 would be assembled to unit 13, the balls would project into the lower end of hinge tube 41 and upper end hinge tube 42, and hingedly retain the units together. They could be readily separated when desired by pulling hard enough on the one unit with respect to the other to cause the balls to be pressed toward each other in tube 44 sufficiently to disengage from the holes in the tubes 41 and 42. This kind of construction can be provided between each of the units and the next adjacent unit to it, as an alternative to the use of the hinge pins such as 31 in each of the five locations. It should also be recognized that a greater number of units made according to the present invention, could be employed, if desired.

Figure 5:
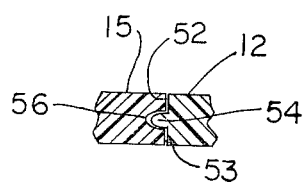
FIG. 5 is an enlarged fragmentary section taken at 5—5 in FIG. 1 and showing edge construction.

It is desirable that dirt and leaves, and to some extent, rain also, be excluded from the interiors of the units. For this purpose, the abutting edges of the units are mating edges. Several versions could be adopted. An example is shown in FIG. 5, where the edge 52 of unit 12 abuttingly engages the edge 53 of unit 15, there being a rib 54 in member 12 and matching groove 56 in member 15, thus providing a tongue-in-groove mating edge. This edge configuration extends from the tops of the units down both the latch side as shown in FIG. 6, and the hinge side, to exclude dirt and rain when the units are closed in the condition shown in FIG. 1.

Figures 4A, 4B, 4C, 4E:
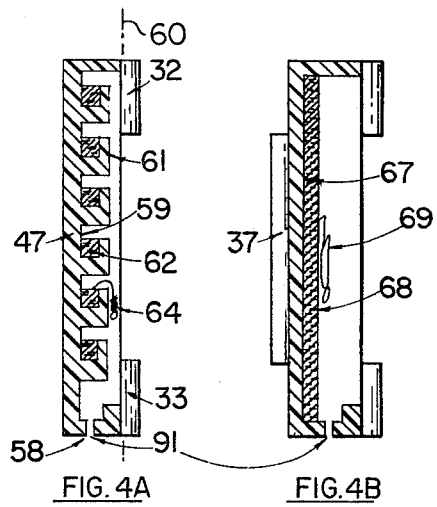
FIGS. 4A through 4F are cross sectional views through all of the units of FIG. 3, the sections being taken at lines 4—4 in FIG. 3 and viewed in the direction of the arrows.
Figure 4D:
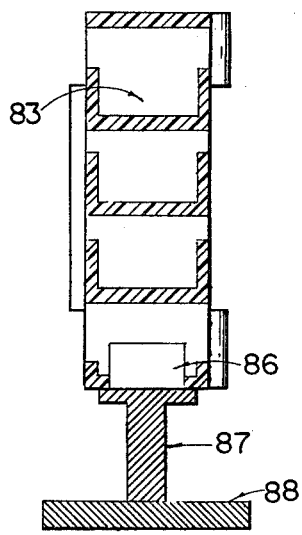
Figure 4F:
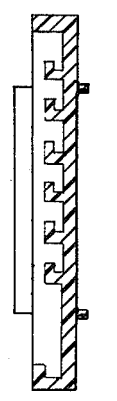

Referring now to FIGS. 3 and 4, units 11 and 12 are constructed in essentially the same way so unit 11 will be described. It has the top with the slot 17 therein, the hinge side 34, the swing or opening side 57 and bottom 58. The upper and lower hinge tubes 32 and 33 have colinear axes 60 which, when assembled with unit 13, are colinear with the axis of the hinge tube aperture for hinge tube 37 of unit 13.

As is best shown in the cross section of FIG. 4, end wall 47 has an interior face 59 to which six shelves 61 are mounted. Each of these shelves is made of a member of angle-shaped cross section providing a bottom and side rail, these members extending the full distance from the hinge side 34 to the swing side 57. An insert 62 is provided in each shelf, such insert being made of a material which is comparatively easily pierceable by a fishhook, but which also will serve to retain a fishhook in it. An example is styrofoam. These inserts extend the full length of the shelves. They thereby serve to receive the hooks of crappie baits. The hook can be mounted in the foam and the bait hung over the rail as at 64, for example. Since the unit 12 is constructed in the same way as unit 11, and both are end units, they are typically referred to as crappie case ends.

Unit 13 is made differently and includes an end wall 66. The inner face 67 of this wall is lined with a member 68 which is a sheet of hook pierceable, but retaining material. A preferred material for this purpose is cork. Plastic foam materials might also be used. Comparatively large baits can be hooked into this surface where desired, and an example is a spoon 69 hooked to the member 68. Since these baits are usually used with casting reels and are hand cranked by the fisherman, after casting, this particular unit of the tackle box is referred to as the "big crank case".

Unit 14 is constructed still differently and has a pair of rods 71 and 72 extending from the hinge side to the swing side. These are centrally located between the edges 73 and 74 and serve to receive the hooks of spinner-type baits. They can be hung on both sides of these rods. That is to say that they can be hung on the side facing the edge 73, or on the side facing the edge 74. This unit is therefore referred to as the spinner crank case.

Unit number 15 has a centrally located panel board 77 extending down from the top to a point 78 and having hook pierceable and retaining sheets 79 and 81 on the opposite faces thereof. These sheets are useful to hang baits thereon such as 82, usually of the surface type. Therefore this unit is referred to as the surface crank case.

Finally, accessory box unit 16 is provided with three shelves 83 extending from the hinge edge to the swing edge and each of which is actually a channel. This is useful for containing miscellaneous items which could include reels, floats, and other items. Although it has not been mentioned above, the bottom of each of the units includes basically a channel-shaped construction when completed, regardless of whether the unit has an end panel such as 47 and 37 in units 11 and 13, respectively, or no member extending the full height, such as is apparent in the units 14, 15 and 16. Therefore, each of the units has a bottom channel such as at 83 in unit 14 and which serves to strengthen the unit as whole. In addition, at least one of the units may be provided with a mounting socket in the bottom. An example is in unit 16 where a pipe flange 86 threadedly receives the upper end of the mounting pipe 87, the lower end of which may be mounted to a large plate 88 which can be placed on the ground or affixed to a deck or the like. The pipe 87, serves as a mounting column and can be used without the base 88 and received in a pipe stand on a boat or can be clamped to a suitable vertically extending surface. Other types of mounting columns can be provided, if desired.

While the basic concept of the invention can be implemented in various materials, including aluminum and plastics, it is believed that molded plastic units would be preferable. Flanges, filets, ribs, angle braces, or the like could be employed where desired to enhance rigidity, depending upon the nature of material selected. The tongue-in-groove configuration of the mating edges of each of the units materially increases the rigidity of the assembly when closed for transportation. It is not necessary that the edges along the bottoms of the unit be mating with the edges along the bottoms of adjacent units. In fact, leaving them open will assist in avoiding any accumulations of moisture between the units. In addition, the bottoms of each of the units can be apertured, if desired, to facilitate draining of the channels therein. Examples are given at 91 in units 11, 13, and 14. Such apertures, if made sufficiently large, could assist in some air circulation through the unit, even when closed, if mounted on a post or the like. Of course, some choice would need to be made between the desirability on such large apertures, and the possible necessity for screening them to prevent contents of the bottom channels from falling through the apertures.

It will be recognized that the present invention makes it easy for the fisherman who is interested in all kinds of fishing, but who is going to limit his activity to a particular type of fishing on any given trip, to exclude those units which normally contain the gear for the type of fishing which will not be done on the trip. Therefore, although the tackle box has great capacity, it is unnecessary that the complete assembly be taken with the fisherman at all times. Each individual unit can be sufficiently large to contain the number of baits or lures of interest to the fisherman for the particular type of fishing to be done, and yet the assembly can be comparatively small. As an example, the spinner bait box 14 has sufficient space on the two rods to hold 96 lures. For this purpose, the box need not be any larger than 2 inches from edge to edge, 12 inches from top-to-bottom, and 19 inches from hinge side to swing side. Examples of thickness of the other boxes are: crappie case 1.25 inches; big crank bait case 1.75 to 2.25 inches; accessory box 2.75 inches; and surface crank case 1.50–2.0 inches.

Figure 8:
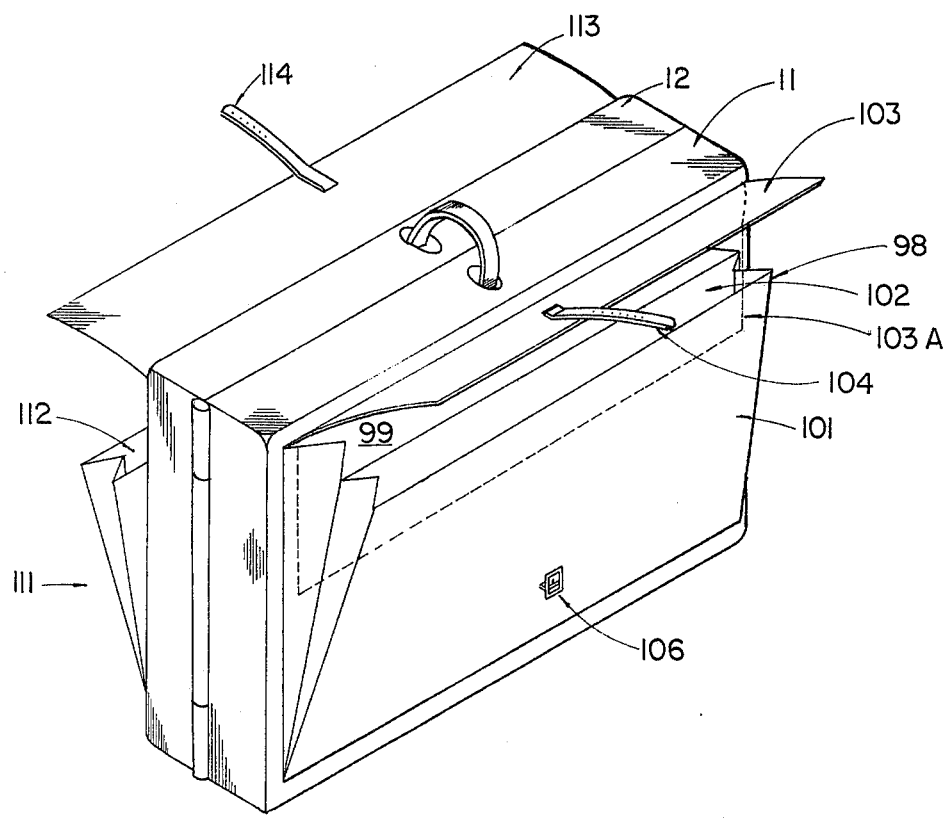
FIG. 8 is a perspective view of the tackle box using only two units, each having a map and chart pocket assembly mounted to it.

Referring now to FIG. 8 the end units 11 and 12 have map and chart pockets on them. They are fastened on the outer end walls of the units by either Velcro brand fabric fastener strips as at 96 on unit 11 or snap fasteners as at 97 on unit 12. Pocket assembly 98 has its back wall 99 fastened to the end wall of unit 11 by Velcro strips (96 FIG. 2). It is of accordian type construction with front wall 101, divider wall 102, and cover flap 103. Apertured strap 104, receivable in buckle 106, is useful to fasten the flap down to close and cover the pocket assembly when the flap is in position shown by dotted outline 103A in FIG. 8, and buckled to buckle 106. Thus the pocket assembly has two pockets therein, separated by divider wall 102. They can be used for charts, maps, rain gear, sandwiches or various other things the fisherman may want to carry and which might not fit well in any of the hinged units. Pocket assembly 111 may be identical to 98, but include snap fasteners fastened to snaps 97 instead of or in addition to Velcro fasteners. One or both pocket assemblies can be readily detached, when desired, and used as a conveniently portable carrying case for the contents thereof. They are preferably made of waterproof material, such as plastic or treated canvas, for example, and weathertight when the flaps are closed and fastened.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A tackle box comprising:
   a plurality of generally rectangular housing units stacked horizontally,
   each of said units having a top and at least one generally straight upstanding hinge side, with hinge means vertically spaced along said side and connected to hinge means on a next adjacent unit, each of said units being thereby hingedly connected to the next adjacent unit,
   a carrying handle at the top of at least one of said units,
   said hinge means having vertical hinge axes and each of said units having a swing side horizontally spaced from the hinge side, the swing sides of adjacent units being horizontally separable from each other to permit access to interiors of said units while hinge sides thereof remain connected to next adjacent units,
   said hinge means being constructed to facilitate intentional disconnection of one of said units from the unit next adjacent to it,
   each of said units having a hinge edge meeting a hinge edge of the next adjacent unit,
   the hinge means including at least one hinge loop on each hinge edge, each loop having a circular aperture with a loop axis, the hinge loops on meeting hinge edges having their loop axes colinear and vertical, and top headed hinge pins received through the apertures of hinge loops having colinear axes to hingedly connect said loops together, but said pins being readily removable upwardly from said hinge loop apertures, to facilitate connection and disconnection of one of said units to another of said units without tools,
   a handle receiver on the top of each of said units,
   said handle having a central hand receiver portion and having end portions attachable to any of said receivers and attached to said handle receivers on at least two of said units,
   said handle being alterable between said hand receiver portion and said end portions to facilitate spanning greater and lesser numbers of units of said plurality of units, intermediate the two units to which said end portions are attached.
2. The tackle box of claim 1 and further comprising:
   latch means on said swing sides of said units and normally retaining the swing side of each unit closed with the swing side of the unit next adjacent to it.
3. The tackle box of claim 1 wherein one of said units is substantially a center unit, the box further comprising:
   a mounting column socket in the bottom of said center unit; and
   a mounting column removably received in said socket and sufficiently sturdy to support said unit above a mount for said column.
4. The tackle box of claim 1 wherein:
   at least one of the top and sides of each unit have edges engaged with edges of the next adjacent unit,
   said engaged edges having at least portions of interengaging mating shapes.
5. The tackle box of claim 4 wherein:
   both the top and sides have engaged edges wherein said shapes are tongue-and-groove.

6. The tackle box of claim 5 wherein:
the tongue edge of one unit is received in the groove edge of the next adjacent unit and inhibits relative movement of said units in a direction transverse to the direction in which said units are stacked.

7. The tackle box of claim 4 and wherein:
there are at least four of said units, including two end units and at least two intermediate units, said intermediate units being interchangeable within the stack.

8. The tackle box of claim 7 wherein:
said shapes are such that with said intermediate units removed from the stack, said end units are hingedly closable together with their edges mating.

9. The tackle box of claim 8 wherein:
each of said units has at least one apertured spring clip latch or latch pin on the swing side thereof for cooperation with the latch pin or spring clip respectively of the next adjacent unit.

10. The tackle box of claim 1 wherein:
there are two units, each having an outer end wall, fastener means are provided on at least one of said end walls, a pocket assembly is removably fastened to said fastener means.

11. The tackle box of claim 10 wherein:
said pocket assembly includes an accordion walled pocket having a cover flap and made of water resistant material.

12. The tackle box of claim 11 wherein said fastener means include Velcro type fastener material on said end wall and on said pocket assembly.

13. The tackle box of claim 10:
fastener means are provided on both of said end walls; and
another pocket assembly is removably fastened to the other of said end walls.

14. The tackle box of claim 13 wherein said plurality of units further comprises:
at least one additional unit intermediate said units having the outer end walls.

15. A tackle box comprising:
a plurality of generally rectangular housing units stacked horizontally,
each of said units having a top and at least one generally straight upstanding hinge side, with hinge means vertically spaced along said side and connected to hinge means on a next adjacent unit, each of said units being thereby hingedly connected to the next adjacent unit,
a carrying handle at the top of at least one of said units,
said hinge means having vertical hinge axes and each of said units having a swing side horizontally spaced from the hinge side, the swing sides of adjacent units being horizontally separable from each other to permit access to interiors of said units while hinge sides thereof remain connected to next adjacent units,
said hinge means being constructed to facilitate intentional disconnection of one of said units from the unit next adjacent to it,
at least two of said units having a cavity in the top thereof, with a horizontally extending slot in the top providing access to the cavity therein, said slots being elongated in a direction perpendicular to a horizontal line from said hinge side to said swing side of the unit, and
said handle having a pair of lugs at each end received in two of said cavities and projecting transverse to the elongated direction of said slots whereby portions of said tops covering said cavities adjacent the sides of said slots retain said handle ends in said cavities, said handle extending in the said direction of elongation of said slots and over units intermediate the ends of the stack and being thereupon useful to carry said tackle box.

16. A tackle box comprising:
a plurality of generally rectangular housing units stacked horizontally,
each of said units having a top and at least one generally straight upstanding hinge side, with hinge means vertically spaced along said side and connected to hinge means on a next adjacent unit, each of said units being thereby hingedly connected to the next adjacent unit,
a carrying handle at the top of at least one of said units,
said hinge means having vertical hinge axes and each of said units having a swing side horizontally spaced from the hinge side, the swing sides of adjacent units being horizontally separable from each other to permit access to interiors of said units while hinge sides thereof remain connected to next adjacent units,
said hinge means being constructed to facilitate intentional disconnection of one of said units from the unit next adjacent to it,
said units including:
first and second end units, each having a top and a bottom and an end wall extending from side-to-side and top to bottom of said unit, and each end wall having a plurality of vertically-spaced, horizontally extending channel members thereon cooperating with the inner surface thereof to form trays to receive crappie baits therein,
a third unit having a top and a bottom and a rear wall and having a fish-hook pierceable and retaining member on said rear wall and covering at least the upper half of the area of said rear wall for hanging big crank baits thereon, and said third unit having an upstanding rail extending from side-to-side and horizontally spaced from each rear wall and cooperating with said rear wall to provide a deep tray for miscellaneous items;
a fourth unit having a top and a bottom and open front and rear, and a pair of vertically spaced rods extending horizontally from side to side and affixed to said sides of said fourth unit and each rod adapted to receive thereover and hooked thereon, the hooks of spinner baits;
a fifth unit having a top and a bottom and a panel extending between the top and bottom and sides and having a hook pierceable and retaining member on front and rear faces of said panel, for hanging surface crank baits at the front and rear faces of said panel; and
a sixth unit having a top and bottom, and a plurality of vertically spaced trays therein extending from side-to-side of said unit.

17. The tackle box of claim 16 and further comprising:
styrofoam bodies in said trays in said first unit to retain fishooks therein:

18. The tackle box of claim 16 wherein:
said hook pierceable and retaining member is made of cork.

19. The tackle box of claim 16 wherein:
said hook pierceable and retaining member is made of plasic foam.

* * * * *